(12) United States Patent
Villarroel et al.

(10) Patent No.: US 8,585,149 B2
(45) Date of Patent: Nov. 19, 2013

(54) DISC RECLINER WITH INTEGRAL TRAVEL STOPS

(75) Inventors: Randolph P. Villarroel, Brampton (CA); Pius Ng, Markham (CA)

(73) Assignee: Magna Seating Inc, Aurora, Ontario (CA)

( * ) Notice: Subject to any disclaimer, the term of this patent is extended or adjusted under 35 U.S.C. 154(b) by 365 days.

(21) Appl. No.: 12/994,891

(22) PCT Filed: May 25, 2009

(86) PCT No.: PCT/CA2009/000715
§ 371 (c)(1),
(2), (4) Date: Nov. 29, 2010

(87) PCT Pub. No.: WO2009/146524
PCT Pub. Date: Dec. 10, 2009

(65) Prior Publication Data
US 2011/0084532 A1    Apr. 14, 2011

Related U.S. Application Data

(60) Provisional application No. 61/057,952, filed on Jun. 2, 2008.

(51) Int. Cl.
*B60N 2/235* (2006.01)

(52) U.S. Cl.
USPC .................................. 297/367 R; 297/367 L (58) Field of Classification Search
USPC ......................................... 297/367 L, 367 R
See application file for complete search history.

(56) References Cited

U.S. PATENT DOCUMENTS

| | | | |
|---|---|---|---|
| 5,692,589 A | 12/1997 | Beguin | |
| 5,769,494 A | 6/1998 | Barrere et al. | |
| 5,779,313 A | 7/1998 | Rohee | |
| 5,857,746 A | 1/1999 | Barrere et al. | |
| 5,881,854 A | 3/1999 | Rougnon-Glasson | |
| 6,312,053 B1 | 11/2001 | Magyar | |
| 6,609,756 B2* | 8/2003 | Kojima et al. | 297/367 R |
| 6,626,495 B2* | 9/2003 | Okazaki et al. | 297/367 R |
| 6,715,835 B2* | 4/2004 | Hoshihara et al. | 297/366 |
| 7,100,987 B2 | 9/2006 | Volker et al. | |
| 7,140,686 B2 | 11/2006 | Rohee | |

(Continued)

FOREIGN PATENT DOCUMENTS

| | | |
|---|---|---|
| CN | 1727218 | 2/2006 |
| CN | 1982117 | 6/2007 |

(Continued)

*Primary Examiner* — David Dunn
*Assistant Examiner* — Tania Abraham
(74) *Attorney, Agent, or Firm* — Miller Canfield (57) ABSTRACT

A disc recliner mechanism includes travel stops to limit angular movement of a seat back through a defined range. At least one pawl on a guide plate of the disc recliner mechanism includes a guide boss with a pair of opposite stop surfaces that contact a respective travel stop formed on a tooth plate of the disc recliner mechanism to limit the range of rotational movement of the tooth plate. The guide boss includes a guide surface which engages a guideway on the tooth plate to provide a free movement range wherein the tooth plate can be rotated through the free movement range without requiring the operation of a release mechanism. The guideways on the tooth plate and the guide bosses on the pawls are designed such that the tooth plate and pawls can be formed with simple stamping operations.

2 Claims, 6 Drawing Sheets

(56) References Cited

U.S. PATENT DOCUMENTS

7,475,945 B2 * 1/2009 Reubeuze et al. ........ 297/367 R
2006/0022503 A1 2/2006 Reubeuze et al.
2008/0047106 A1 2/2008 Burckhard et al.

FOREIGN PATENT DOCUMENTS

| CN | 101155713 | 4/2008 |
| DE | 102006015560 | 8/2007 |
| EP | 0024976 | 3/1981 |

* cited by examiner

DISC RECLINER WITH INTEGRAL TRAVEL STOPS

CROSS-REFERENCE TO RELATED APPLICATIONS

This application is a national phase application and claims priority to and all the benefits of, under 35 USC 371, of PCT/CA2009/000715, filed on May 25, 2009, which in turn claims the priority of U.S. Provisional Application No. 61/057,952, filed on Jun. 2, 2008 and entitled "Disc Recliner With Integral Travel Stops." All applications are incorporated herein by reference in their entireties.

BACKGROUND OF THE INVENTION

1. Field of the Invention

The present invention relates to a disc recliner mechanism for automotive seating. More specifically, the present invention relates to a disc recliner mechanism which includes integral stops to limit the range of movement of a seat back relative to a seat cushion.

2. Description of Related Art

Many automotive seats have seat backs whose position, relative to a seat cushion, can be altered by the vehicle occupant for comfort positioning and/or to provide access to an interior of the vehicle. Disc recliner mechanisms are commonly employed to provide the relative movement between the seat back and the seat cushion and such disc recliner mechanisms often include a tooth plate and a guide plate which includes a set of pawls which can selectively interlock with the tooth plate to maintain the seat back in a desired position.

Typically, the tooth plate portion of the disc recliner mechanism is affixed to the seat back and the guide plate portion of the disc recliner mechanism is affixed to the seat cushion, although the mechanism can also be mounted in the opposite sense.

While such disc recliner mechanisms are well known and are widely employed, they do suffer from disadvantages. In particular, it is generally desired to provide travel stops in the disc recliner mechanism which limit the range of movement of the seat back. For example, it may be desired to limit the range of forward movement of the seat back to prevent the seat back from contacting a dashboard of the vehicle. Similarly, it may be desired to limit the range of backward movement of the seat back to prevent undesired intrusion of the seat back into a rear seating space of the vehicle.

It is known to provide travel stops in disc recliner mechanisms to limit the range of movement of the seat back but, to date, the provision of these travel stops has necessitated expensive tooling and/or complex manufacturing processes to produce the disc recliner mechanism.

SUMMARY OF THE INVENTION

It is an object of the present invention to provide a novel disc recliner mechanism with integral travel stops which obviates or mitigates at least one disadvantage of the prior art.

According to a first embodiment of the present invention, a disc recliner mechanism includes a guide plate and at least one pawl mounted to the guide plate. The pawl is moveable radially with respect to the guide plate. The pawl includes a set of teeth on the radially outer surface of the pawl and a guide boss extending generally orthogonally to the plane of the pawl. A tooth plate has a set of inwardly extending teeth located about the circumference of the tooth plate that are complementary to the teeth on the pawl. The tooth plate also includes at least two travel stops whereby the guide boss abuts one of the travel stops when the tooth plate is at a predefined limit of rotational movement in a first direction and abuts the other of the travel stops when the tooth plate is at a predefined limit of rotational movement in a second direction.

The tooth plate further includes a guideway and the guide boss on the pawl engages the guideway to prevent inter-engagement of the teeth on the pawl with the teeth on the tooth plate through a pre-defined range of rotational movement of the tooth plate.

According to a second embodiment of the present invention, a disc recliner mechanism includes a guide plate and a pair of pawls mounted to the guide plate. The pawls are movable radially with respect to the guide plate. Each pawl includes a set of teeth on the radially outer surface of the pawl and a guide boss extending generally orthogonally to the plane of the pawl. A tooth plate has a set of inwardly extending teeth located about the circumference of the tooth plate that are complementary to the teeth on each pawl. The tooth plate also includes at least one travel stop whereby the guide boss on one of the pawls abuts the travel stop when the tooth plate is at a predefined limit of rotational movement in a first direction and the guide boss on the other of the pawls abuts the travel stop when the tooth plate is at a predefined limit of rotational movement in a second direction.

According to a third embodiment of the present invention, a disc recliner mechanism for an automotive vehicle seat allows selective pivotal movement of a seat back relative to a seat cushion between a rearward position and a forward position. The disc recliner mechanism includes a guide plate adapted to be mounted to one of the seat cushion and seat back and a tooth plate adapted to be mounted to the other of the seat cushion and seat back. The tooth plate includes a pair of travel stops. At least one pawl is operatively coupled to the guide plate for movement between a first position engaged with the tooth plate thereby locking the guide plate and tooth plate together to prevent pivotal movement of the seat back and a second position disengaged with the tooth plate thereby unlocking the guide plate and tooth plate to allow pivotal movement of the seat back. The pawl includes a guide boss extending generally orthogonally to the plane of the pawl toward the tooth plate. The guide boss abuts one of the travel stops when the tooth plate is rotated in a first direction relative to the guide plate and the seat back is in the rearward position. The guide boss abuts the other of the travel stops when the tooth plate is rotated in a second direction relative to the guide plate and the seat back is in the forward position.

The guideways on the tooth plate and the guide bosses on the pawls are designed such that the tooth plate and pawls can be formed with simple stamping operations.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE EMBODIMENTS

Figure 1:
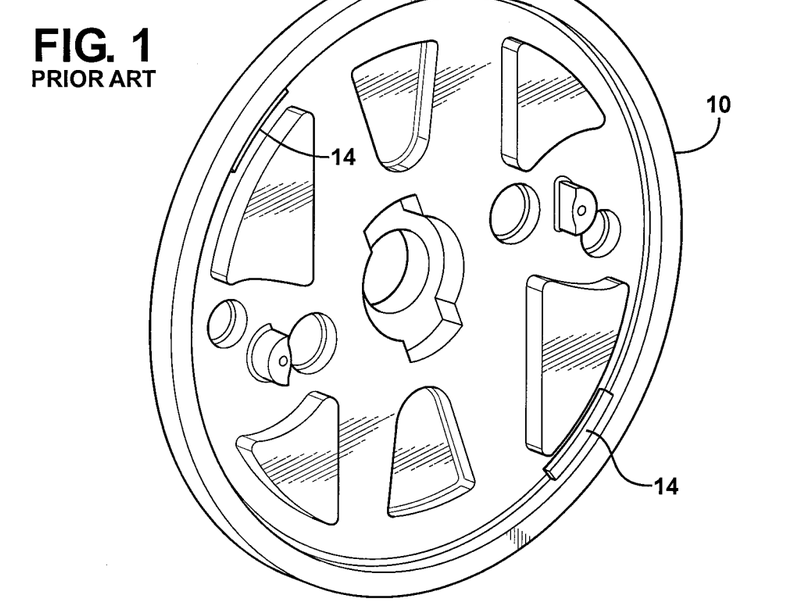
FIG. 1 shows a perspective view of a guide plate from a prior art disc recliner mechanism.
Figure 2:
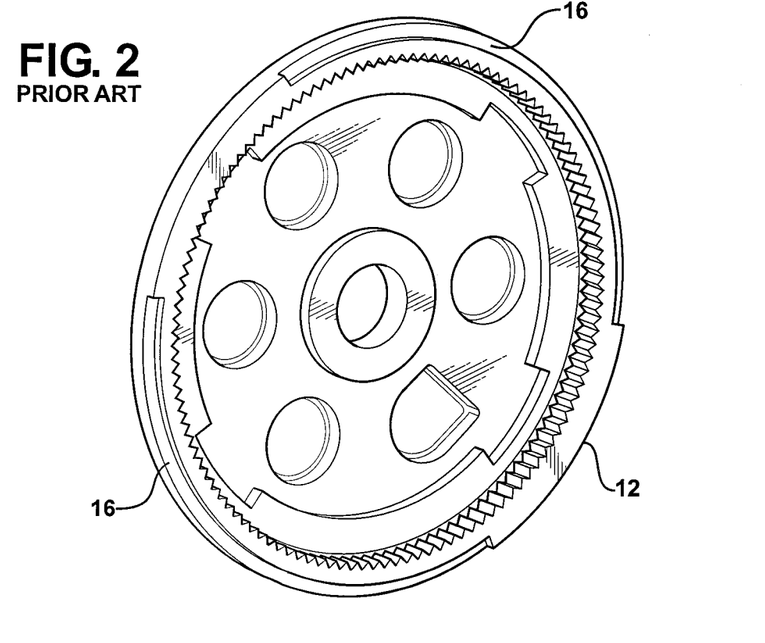
FIG. 2 shows a perspective view of a tooth plate which operates with the prior art guide plate of FIG. 1.

Before describing an embodiment of the present invention, a prior art disc recliner mechanism is discussed, for clarity, with reference to FIGS. 1 and 2. A guide plate for the prior art disc recliner mechanism is indicated at 10 in FIG. 1 and the corresponding tooth plate is indicated at 12 in FIG. 2. As can be seen, the guide plate 10 includes a pair of raised stops 14 and the tooth plate 12 includes a complementary pair of travel slots 16. When the disc recliner mechanism is assembled the raised stops 14 on the guide plate 10 engage the complementary pair of travel slots 16 in the tooth plate 12. The raised stops 14 and travel slots 16 limit the range of rotational movement of the tooth plate 12 relative to guide plate 10. The raised stops 14 can move along the travel slots 16 but cannot move beyond the respective ends of the travel slots 16, thus preventing rotational movement of the tooth plate 12 beyond the limits defined by the travel slots 16.

The guide plate 10 and the tooth plate 12 are manufactured by stamping and, as will be apparent to those of skill in the art, the formation of the travel slots 16 requires the coining of a significant amount of material from the tooth plate 12, thus requiring a complex and/or expensive tool to manufacture the tooth plate 12.

Figure 3:
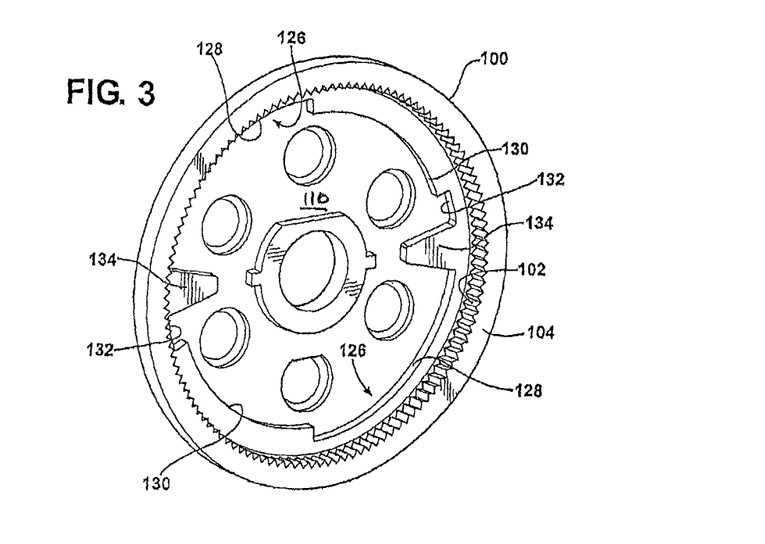
FIG. 3 shows a perspective view of a tooth plate from a disc recliner mechanism in accordance with the present invention.

An embodiment of a disc recliner mechanism in accordance with the present invention will now be described with reference to FIGS. 3 through 8. FIG. 3 shows a tooth plate 100 for use in the disc recliner mechanism of the present invention. As shown, the tooth plate 100 includes a set of teeth 102 which extend radially inwardly of the inner circumference of a circumferential lip 104 of the tooth plate 100. The tooth plate 100 is designed such that it can be relatively easily formed by stamping operations.

Figure 4:
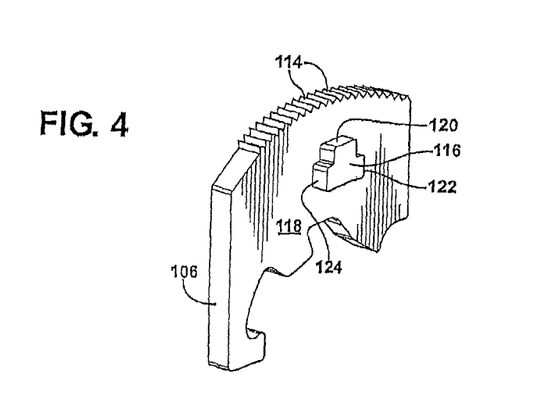
FIG. 4 shows a perspective view of a pawl from the disc recliner mechanism in accordance with the present invention.
Figure 5:
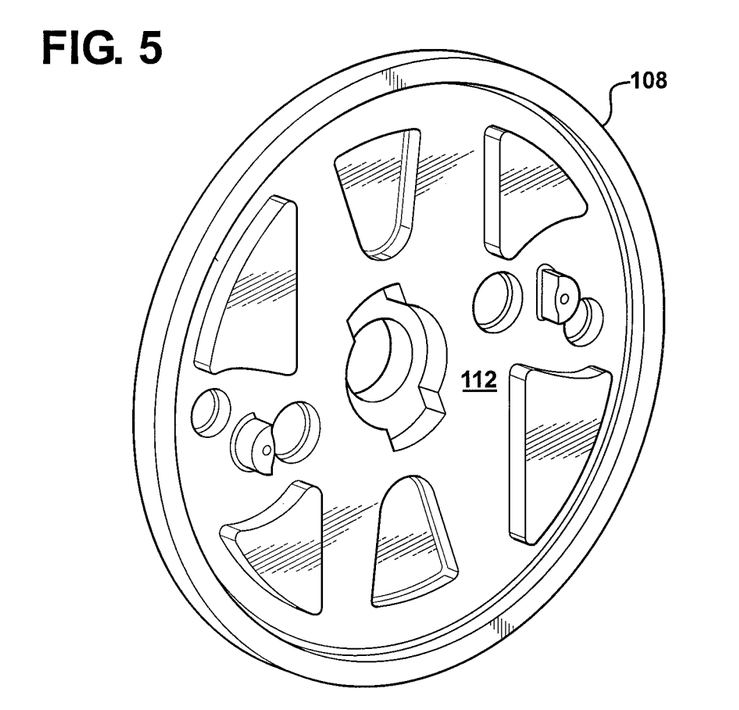
FIG. 5 shows a perspective view of a guide plate which operates with the tooth plate of FIG. 3.

FIG. 4 shows a pawl 106 which is carried by a guide plate 108, which is shown in FIG. 5. An inner side 110 of the tooth plate 100 and an inner side 112 of the guide plate 108 are in facing relation when the disc recliner mechanism is assembled. The pawl 106 includes a set of teeth 114 on the radially outer surface thereof. The teeth 114 on the pawl 106 are complementary to and can inter-engage with the teeth 102 on the tooth plate 100 to lock the rotational position of the tooth plate 100 relative to the guide plate 108. As with the tooth plate 100, the pawl 106 is designed such that it can be relatively easily formed by stamping operations.

Figure 6:
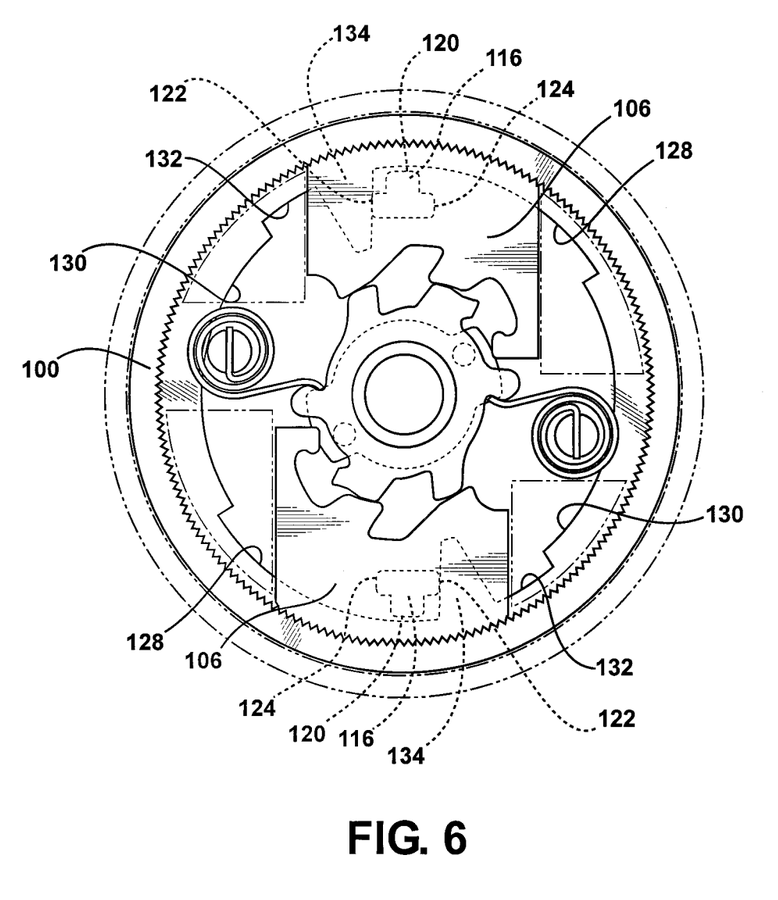
FIG. 6 shows a partially cut-away view of the disc recliner mechanism in accordance with the present invention at a rearward limit of movement.
Figure 7:
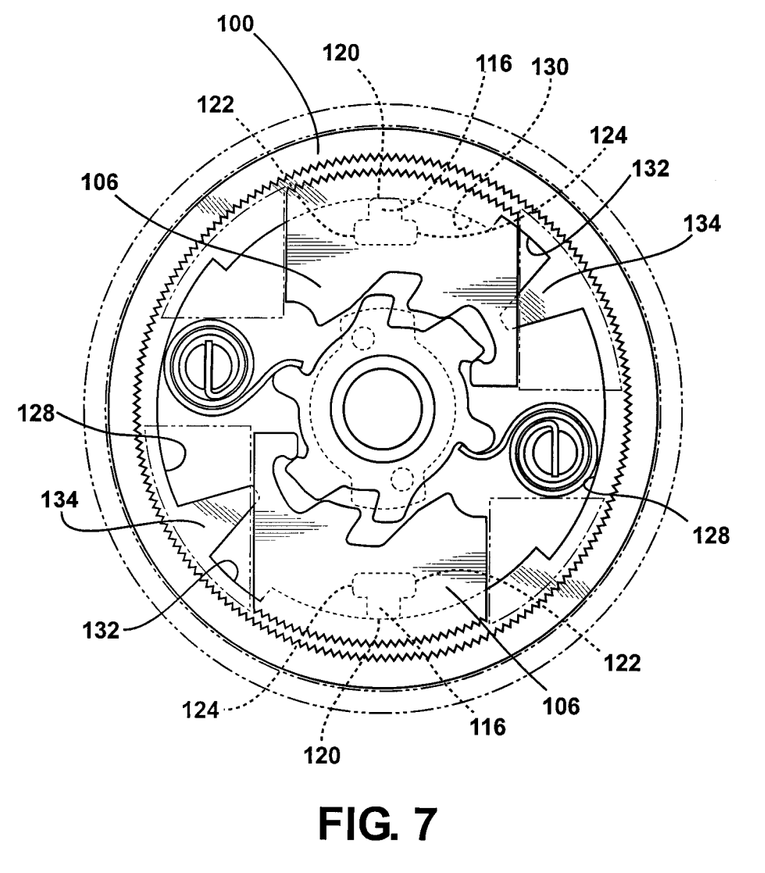
FIG. 7 shows a partially cut-away view of the disc recliner mechanism in accordance with the present invention in a free travel range.
Figure 8:
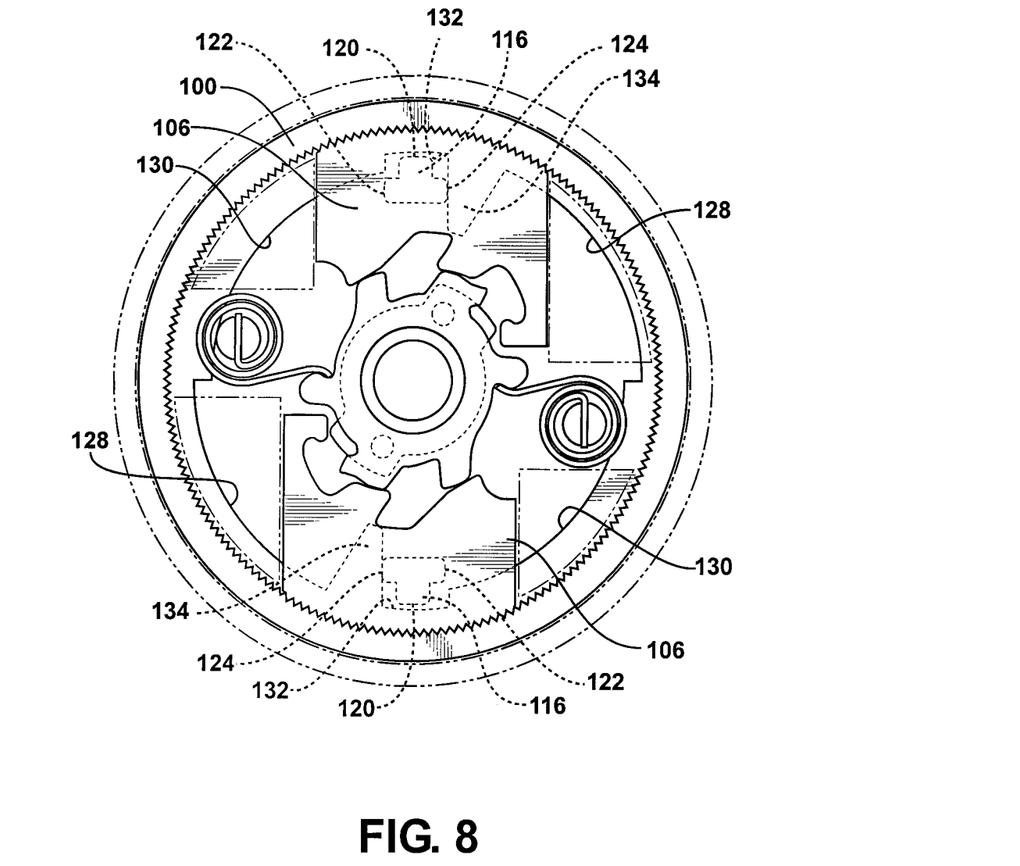
FIG. 8 shows a partially cut-away view of the disc recliner mechanism in accordance with the present invention at a forward limit of movement

The pawl 106 also includes a guide boss 116 protruding from a first side 118 of the pawl 106, which can be formed by a semi-pierce during a stamping process. The guide boss 116 extends generally orthogonally to the plane of the pawl 106. When the disc recliner mechanism is assembled the first side 118 of the pawl 106 is in facing relation with the inner side 110 of the tooth plate 100. Thus, the guide boss 116 extends toward the inner side 110 of the tooth plate 100. The guide boss 116 includes a guide surface 120 and first 122 and second 124 stop surfaces. The guide surface 120 is disposed radially inward of the teeth 114 on the pawl 106. The first 122 and second 124 stop surfaces face in substantially opposite directions and are generally orthogonal to the guide surface 120. In the embodiment shown, the disc recliner mechanism includes a pair of pawls 106, as illustrated in FIGS. 6 through 8. The pawls 106 are typically biased toward the teeth 102 on the tooth plate 100 by springs, or other suitable mechanisms, and are moved back away from the teeth 102 by a release mechanism, such as a lever, which operates an appropriate set of cams or other mechanisms. The present invention is not limited to use with any particular set of mechanisms for moving the pawls 106, and more specifically, the teeth 114 on the pawls 106 into or out of engagement with the teeth 102 on the tooth plate 100. The particular mechanisms illustrated in FIGS. 6 through 8 are merely shown as one possible embodiment.

As can be seen in FIG. 3, the inner circumference of the circumferential lip 104 on the tooth plate 100 includes a pair of guideways 126, each of which extends around approximately one half of the inner circumference. The guideways 126 are offset orthogonally relative to the teeth 102 on the tooth plate 100 or deeper into the tooth plate 100. Each guideway 126 includes a first radially recessed portion 128, a radially raised portion 130, and a second radially recessed portion 132. A travel stop 134 is located between the ends of each guideway 126 such that in the embodiment shown, there are two travel stops 134. The first radially recessed portion 128 of each guideway 126 is disposed adjacent one of the travel stops 134 and extends in a clockwise direction to the radially raised portion 130, which extends in the clockwise direction to the second radially recessed portion 132. The second radially recessed portion 132 is disposed adjacent the other one of the travel stops 134. The circumferential lengths of the first radially recessed portion 128 and the radially raised portion 130 are greater than the circumferential length of the second radially recessed portion 130. It is appreciated that the circumferential lengths of the first radially recessed portion 128, the radially raised portion 130, and the second radially recessed portion 132 can be any circumferential length depending on the desired operation of the disc recliner mechanism. As will be apparent to those of skill in the art, the guideways 126 can be formed by fine blanking during a stamping process.

Referring to FIGS. 6 through 8, the disc recliner mechanism of the present invention is assembled and the guide plate 108 is partially cut-away to illustrate the interaction between the pawls 106 and the tooth plate 100. More specifically, when the disc recliner mechanism is assembled the guide surface 120 of the guide boss 116 interacts with the guideway 126. When the guide surface 120 is within the first radially recessed portion 128, the teeth 114 on the pawls 106 can inter-engage with the teeth 102 on the tooth plate 100 to lock the tooth plate 100 in any of a plurality of rotational positions when the release lever (not shown) of the disc recliner mechanism is released. The selected rotational position of the tooth plate 100 corresponds to one of a plurality of reclined seating positions of a seat back (not shown).

When the guide surface 120 of the guide boss 116 engages the radially raised portion 130, the pawls 106 are kept radially retracted, preventing inter-engagement of the teeth 110 on the pawls 106 with the teeth 102 on the tooth plate 100 even when the release lever of the disc recliner mechanism has been released. As such, the disc recliner is in a free travel range wherein the tooth plate 100 and the seat back can be moved without requiring the release lever of the disc recliner mechanism to be held in a release position. Such free travel ranges can be provided to allow the seat back to be moved through non-passenger seating positions to ease entry and egress from the vehicle and/or cargo loading and unloading.

When the guide surface 120 of the guide boss 116 is within the second radially recessed portion 132, the teeth 110 on the pawls 106 can inter-engage with the teeth 102 on the tooth plate 100 to lock the tooth plate 100 into a forward rotational position when the release lever of the disc recliner mechanism is released. The forward rotational position of the tooth plate 100 corresponds to a forward inclined or stowed position of the seat back. Therefore, when the seat back is in the forward inclined or stowed position and the tooth plate 100 is locked, the release mechanism must be actuated to unlock the tooth plate 100 for rotational movement back through the free travel range. Alternatively, the guideways 126 may include only the first radially recessed portion 128 and the radially raised portion 130 without varying from the scope of the invention. In such an embodiment, the first radially recessed portion 128 extends in the clockwise direction from one of the travel stops 134 to the radially raised portion 130, which extends in the clockwise direction to the other one of the travel stops 134. In this instance the release mechanism does not need to be actuated to unlock the tooth plate 100 for rotational movement back through the free travel range.

In addition to interacting with the guideways 126 to provide the free travel range, the guide boss 116 also cooperates with the travel stops 134 to provide travel range limits for the disc recliner mechanism. Specifically, when the tooth plate 100 approaches the end of its defined range of rearward rotational movement, the first stop surface 122 of each guide boss 116 will abut one of the respective travel stops 134, as shown in FIG. 6, to prevent further rearward pivotal movement of the seat back. When the first stop surface 122 of each guide boss 116 abuts the travel stops 134, the seat back is in a full rearward reclined seating position.

Similarly, when the tooth plate 100 approaches the end of its defined range of forward rotational movement, the second stop surface 124 of each guide boss 116 will abut the respective other of the travel stops 134 to prevent further forward pivotal movement of the seat back, as shown in FIG. 8. When the second stop surface 124 of each guide boss 116 abuts the travel stops 134, the seat back is in the forward inclined or stowed position. Thus, the first 122 and second 124 stop surfaces of the guide bosses 116 and the travel stops 134 cooperate to limit rotational movement of the tooth plate 100 to the defined range of movement, which in turn limits the pivotal movement of the seat back.

Referring to FIG. 7, the disc recliner mechanism is shown in the free travel range wherein the tooth plate 100 and the seat back can be moved without requiring the release lever of the disc recliner mechanism to be held in the release position. As described above, when the disc recliner mechanism is in the free travel range the guide surface 120 of the guide boss 116 engages the radially raised portion 130 of the guideway 126. Thus, the pawls 106 are kept radially retracted, which prevents inter-engagement of the teeth 110 on the pawls 106 with the teeth 102 on the tooth plate 100.

While the embodiment of the present invention described above includes two pawls 106, each with the guide boss 116, the present invention is not so limited. Specifically, it is contemplated that a disc recliner mechanism in accordance with the present invention can include a single pawl 106, or three or more pawls 106 if desired. It is further contemplated that only one pawl 106 need include the guide boss 116 with first 122 and second 124 stop surfaces to abut the travel stops 134 in order to limit rotational movement of the tooth plate 100, although it is preferred that each pawl 106 be so equipped.

It is also contemplated that with two pawls 106 each having the guide boss 116, only one travel stop 134 is required to limit rotational movement of the tooth plate 100. For example, the guide boss 116 on one of the pawls 106 will abut the travel stop 134 when the tooth plate 100 is at the end of its defined range of rearward rotational movement and the guide boss 116 on the other of the pawls 106 will abut the same travel stop 134 when the tooth plate 100 is at the end of its defined range of forward rotational movement.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A disc recliner mechanism for an automotive vehicle seat to allow selective pivotal movement of a seat back relative to a seat cushion between a rearward reclined position and a forward stowed position overlying the seat cushion, said disc recliner comprising:

a guide plate adapted to be mounted to one of the seat back and the seat cushion;

a tooth plate adapted to be mounted to the other of the seat back and the seat cushion, said tooth plate including a set of inwardly extending teeth located about the circumference of said tooth plate and a pair of travel stops; and at least one pawl including a set of teeth on the radially outer surface thereof for selective interlocking engagement with said teeth on said tooth plate, each of said pawls operatively coupled to said guide plate for movement between a first position engaged with said tooth plate thereby locking said guide plate and said tooth plate together to prevent pivotal movement of the seat back and a second position disengaged with said tooth plate thereby unlocking said guide plate and said tooth plate to allow pivotal movement of the seat back, said at least one pawl including a guide boss extending generally orthogonally to the plane of said at least one pawl and extending toward said tooth plate;

whereby said guide boss abuts one of said pair of travel stops when said tooth plate is rotated in a first direction relative to said guide plate and the seat back is in the rearward position, and whereby said guide boss abuts the other of said pair of travel stops when said tooth plate is rotated in a second direction relative to said guide plate and the seat back is in the forward position, said guide boss including a guide surface and opposite first and second stop surfaces, said guide surface disposed radially inward of said set of teeth on said at least one pawl, and said first and second stop surfaces disposed generally orthogonal to said guide surface, whereby said first stop surface abuts a respective one of said pair of travel stops when said tooth plate is rotated in said first direction relative to said guide plate and the seat back is in the rearward position, and whereby said second stop surface abuts the other of said pair of travel stops when said tooth plate is rotated in said second direction relative to said guide plate and the seat back is in the forward position;

wherein said tooth plate includes a guideway disposed radially inward of said set of teeth on said tooth plate and said guide surface of said guide boss engages said guideway to prevent inter-engagement of said set of teeth on said at least one pawl with said set of teeth on said tooth plate thereby unlocking said guide plate and said tooth plate to allow pivotal movement of the seat back through a first pre-defined range of movement, said guideway including a pair of first radially recessed portions extending circumferentially between opposite first and second ends, a pair of second radially recessed portions extending circumferentially between opposite first and second ends, and a radially raised portion seated between said first ends of each of said first and second radially recessed portions, and wherein one of said pair of travel stops is seated between said second ends of each of said first and second radially recessed portions; whereby said guide surface of said guide boss engages said radially raised portions to prevent inter-engagement of said set of teeth on said at least one pawl with said set of teeth on said tooth plate thereby unlocking said guide plate and said tooth plate to allow pivotal movement of the seat back through said first pre-defined range of movement, and whereby said guide surface of said guide boss is disposed within said first radially recessed portions to allow inter-engagement of said set of teeth on said at least one pawl with said set of teeth on said tooth plate thereby locking said guide plate and said tooth plate to prevent pivotal movement of the seat back within a second pre-defined range of movement, and whereby said guide surface of said guide boss is disposed within said second radially recessed portions to allow inter-engagement of said set of teeth on said at least one pawl with said set of teeth on said tooth plate thereby locking said guide plate and said tooth plate to prevent pivotal movement of the seat back when the seat back is in the forward position.

2. A disc recliner mechanism according to claim 1 wherein said pair of travel stops are offset orthogonally relative to said set of teeth on said tooth plate and extend radially inward and wherein said travel stops are diametrically opposed.

* * * * *